United States Patent
Herbst et al.

(10) Patent No.: US 6,805,414 B2
(45) Date of Patent: Oct. 19, 2004

(54) CLAMP ASSEMBLY AND METHOD

(75) Inventors: Robert J. Herbst, Avon, OH (US); Gregory R. Ashley, Armherst, OH (US); George S. Wagner, Lorain, OH (US)

(73) Assignee: Bendix Commercial Vehicle Systems LLC

( * ) Notice: Subject to any disclaimer, the term of this patent is extended or adjusted under 35 U.S.C. 154(b) by 132 days.

(21) Appl. No.: 09/924,186

(22) Filed: Jul. 30, 2001

(65) Prior Publication Data

US 2003/0020325 A1 Jan. 30, 2003

(51) Int. Cl.[7] ................................................ B60T 8/36
(52) U.S. Cl. ............................ 303/119.3; 303/DIG. 10
(58) Field of Search ........................... 303/119.2, 119.3, 303/DIG. 10

(56) References Cited

U.S. PATENT DOCUMENTS

| | | | | |
|---|---|---|---|---|
| 4,626,045 A | * | 12/1986 | Takei et al. ............... | 303/119.3 |
| 4,789,208 A | * | 12/1988 | Kohno ....................... | 303/115.4 |
| 5,007,455 A | * | 4/1991 | Hawker ..................... | 303/119.3 |
| 5,066,076 A | * | 11/1991 | Troster ...................... | 303/113.1 |
| 5,449,019 A | * | 9/1995 | Hara ......................... | 137/596.17 |
| 5,460,437 A | * | 10/1995 | Hara ......................... | 303/119.3 |
| 5,649,812 A | * | 7/1997 | Schoenmeyr et al. ........ | 417/363 |
| 5,842,753 A | * | 12/1998 | Staib et al. ............... | 303/119.3 |
| 5,921,639 A | * | 7/1999 | Hosoya ..................... | 303/119.2 |
| 6,186,603 B1 | * | 2/2001 | Park ......................... | 303/119.3 |
| 6,254,048 B1 | | 7/2001 | Ashley et al. | |

* cited by examiner

*Primary Examiner*—Robert A. Siconolfi
(74) *Attorney, Agent, or Firm*—Calfee, Halter & Griswold LLP

(57) ABSTRACT

A valve assembly for use in an air brake system is provided. The assembly includes a modulator housing, a valve assembly, and a clamp for holding the valve assembly in an operative position on the modulator housing. One leg of the clamp is fit over retaining bosses on the housing. Another leg of the clamp is bent or advanced toward a retainer that cooperates with a retaining opening on the leg to maintain the clamp in a tensioned state and secure the valve assembly to the modulator housing.

27 Claims, 5 Drawing Sheets

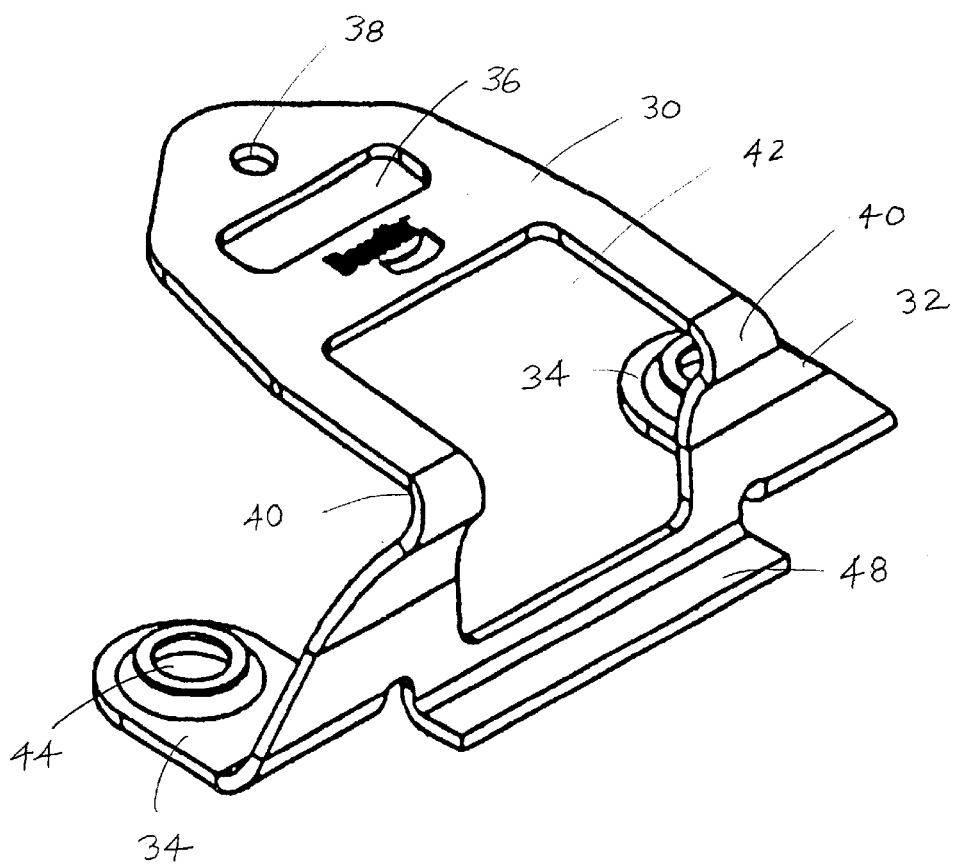
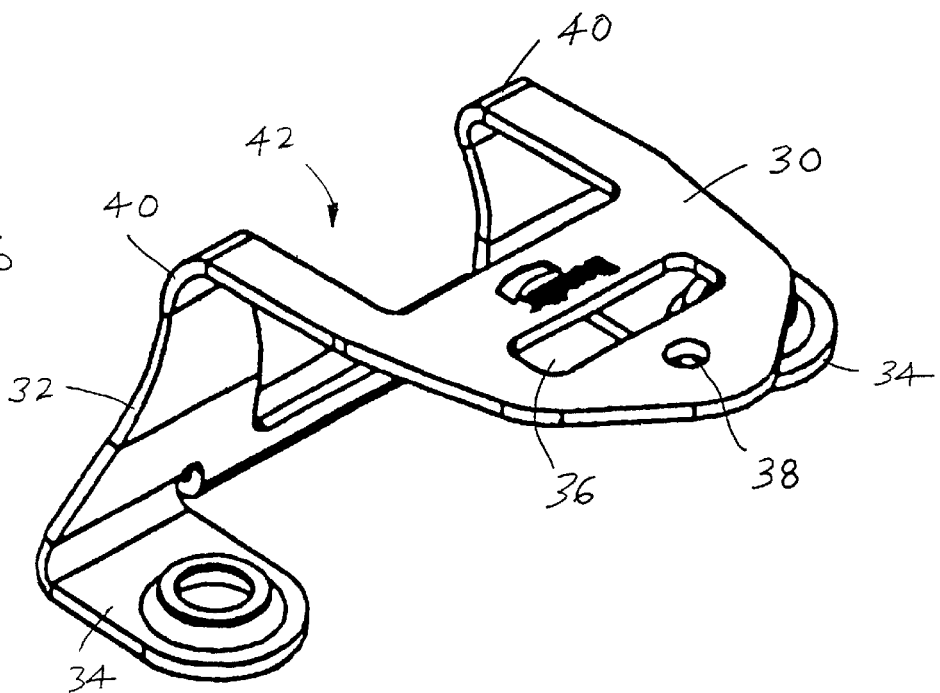

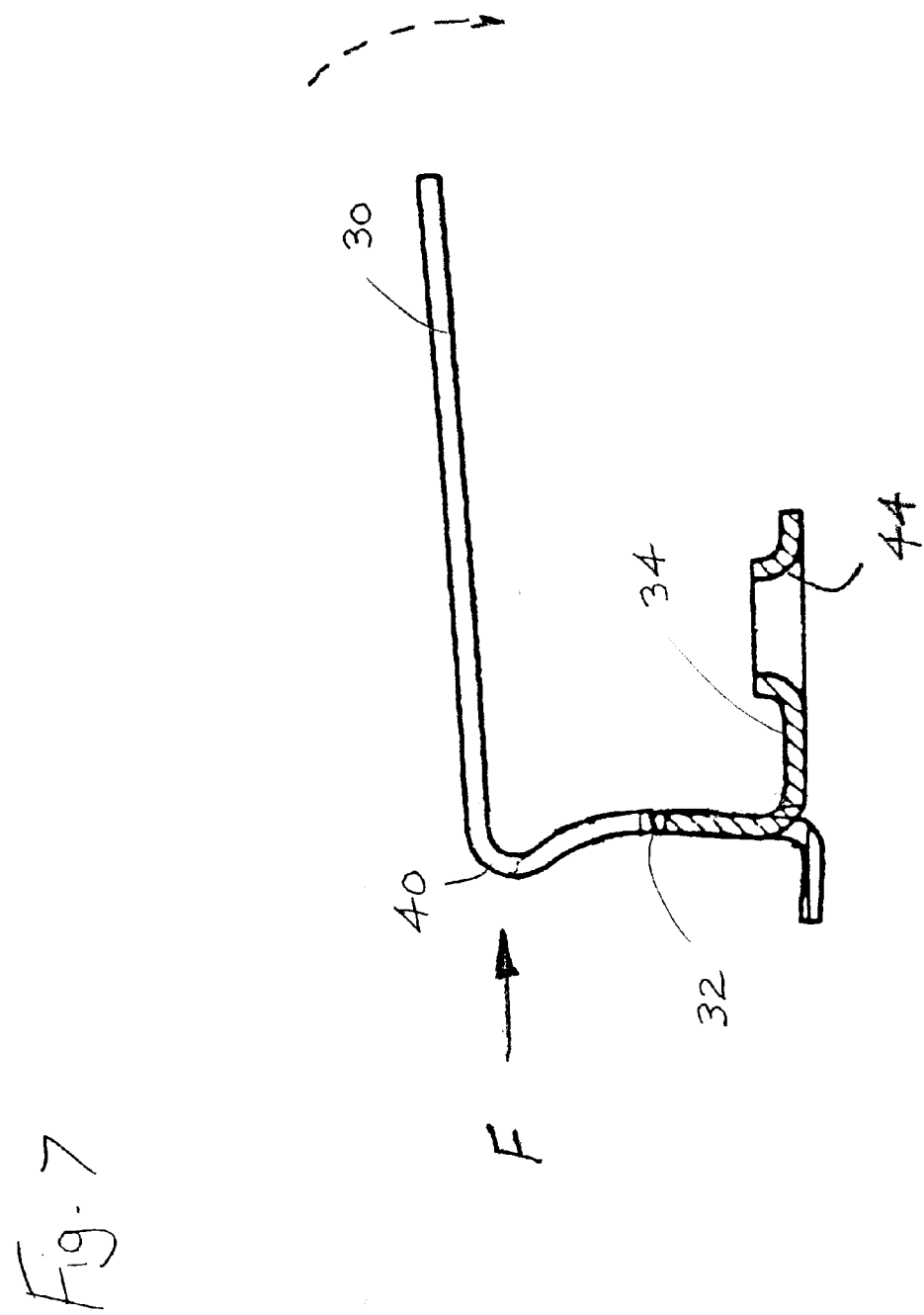

CLAMP ASSEMBLY AND METHOD

BACKGROUND OF THE INVENTION

The present invention relates to an improved clamp assembly and, more specifically, to an improved clamp assembly for holding a solenoid pack to a modulator housing for tractor trailer brake systems. However, it will be appreciated that the present invention is also amenable to other like applications.

A need exists for a new clamping assembly, particularly one that resolves problems associated with securing a solenoid valve assembly to a modulator housing as used in an air brake system for heavy vehicles. The modulator housing is usually a cast and machined component, for example a die cast aluminum part. Openings are provided in the housing to receive a solenoid pack used to effect antilock braking features for the brake system. The solenoid pack typically includes first and second solenoid valve assemblies that are encased in a plastic over-molded material. Unfortunately, space constraints, manufacturing concerns, and magnetic property considerations led to development of a solenoid pack that had no attachment mechanism. However, an effective, robust, and reliable attachment of the solenoid pack to the modulator housing is required. Moreover, the clamping arrangement must not damage the solenoid pack which thereby limits known clamping structures that would adversely impact on the plastic construction of the solenoid pack.

SUMMARY OF THE INVENTION

The present invention provides a clamp assembly that robustly clamps a solenoid pack to a modulator housing without damaging same and without using fasteners.

In accordance with one aspect of the present invention, a preferred clamp assembly for use in an anti-lock brake system is provided. The clamp assembly cooperates with a modulator housing, a valve assembly, and specifically employs a spring clamp for holding the valve assembly in an operative position on the modulator housing.

In accordance with another aspect of the present invention, the assembly includes a raised boss and a raised tab on the modulator housing. The clamp assembly further comprises a first leg that engages the raised tab of the modulation housing. A second leg is disposed generally perpendicular to the first leg and a third leg includes an opening that engages the raised boss of the modulator housing. The third leg is dimensioned to be in parallel, tensioned relation relative to the first leg upon engagement with the modulator housing.

In accordance with yet another aspect of the present invention, a method of holding a valve assembly to a modulator housing by means of a clamp is provided. The clamp includes a first leg defining openings thereon, a second leg extending therefrom and interconnecting the first leg with a third leg having engagement means defined thereon. The second leg is disposed substantially perpendicular to the first and third legs. The method comprises the step of positioning the valve assembly on the modulator housing wherein clamp openings are aligned with raised bosses of the modulator housing. A force is applied to the clamp to secure the valve assembly to the modulator housing and cause the engagement means of the clamp to fasten onto a raised tab of the modulator housing. The clamp elastically deforms and maintains a force against the valve assembly onto the modulator housing.

One advantage of the present invention resides in a simple design to clamp a solenoid pack to a modulator housing.

Another advantage of the present invention is found in the ability to securely hold a solenoid pack to a modulator housing.

Still further benefits and advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the presently preferred embodiments and are not to be construed as limiting the invention.

FIG. 5 is a perspective view of the clamp of FIG. 1.

FIG. 6 is another perspective view of the clamp of FIG. 1.

FIG. 7 is an elevational view, partly in cross-section, of the clamp of FIG. 1 in an unclamped position.

DETAILED DESCRIPTION OF THE INVENTION

Figure 1:
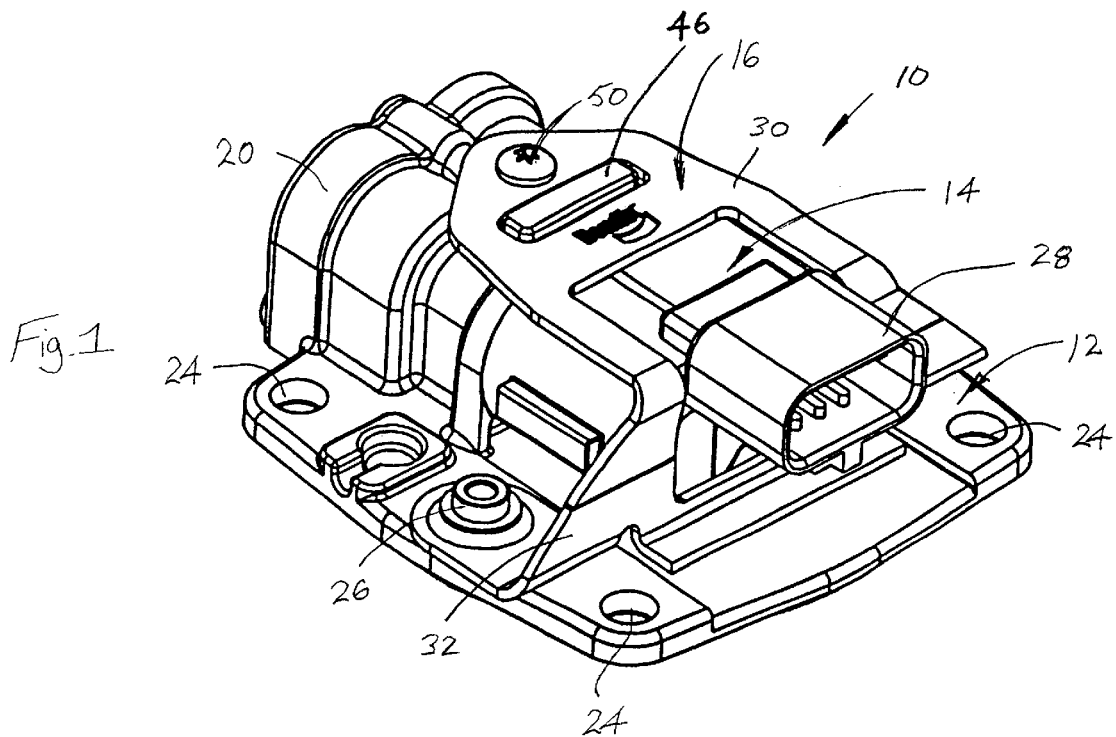
FIG. 1 is a perspective view of a clamp assembly in accordance with the present invention.
Figure 2:
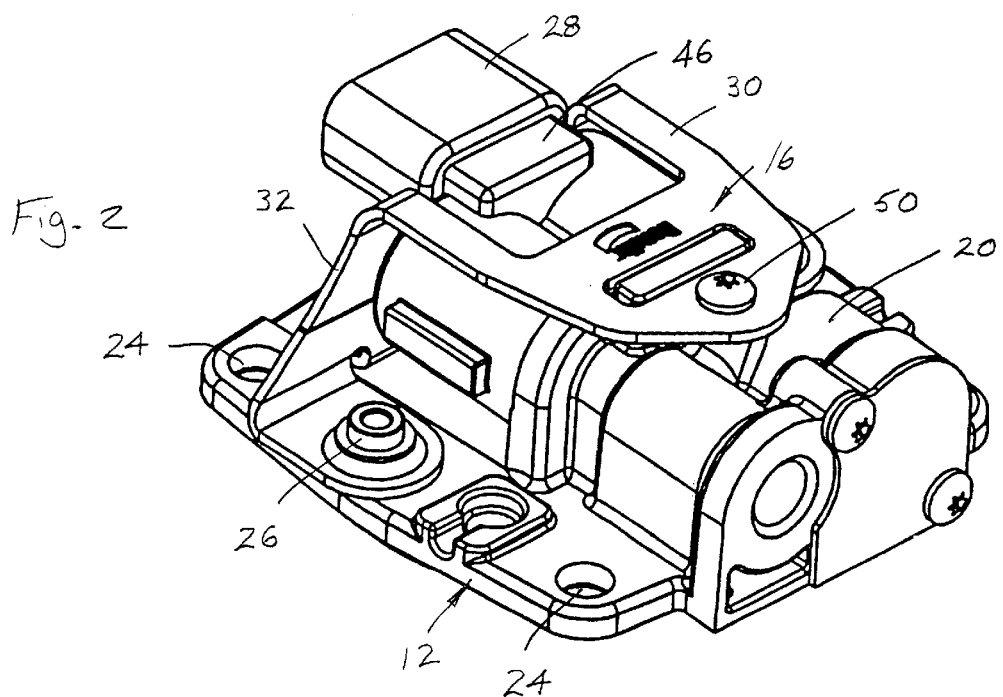
FIG. 2 is another perspective view of the clamp assembly shown in FIG. 1.

With reference to FIGS. 1 and 2, a modulator valve assembly incorporating a new clamp assembly as generally indicated by reference numeral 10. The assembly comprises a modulator housing 12, a valve assembly or solenoid pack 14, and a clamp 16 for holding the valve assembly in position on the modulator housing. Preferably, the clamp is a stamped spring component while the modulator housing is cast aluminum and the solenoid pack includes a plastic overmolded housing. Of course, other alternative materials or constructions can be used without departing from the scope and intent of the present invention. The general structure and operation of a modulator valve of this type in an air braking system is generally known in the art so that a discussion of the detailed aspects of the modulator valve and solenoid valves associated with ABS features of the brake system form no part of the present invention and therefore will not be described herein.

Figure 3:
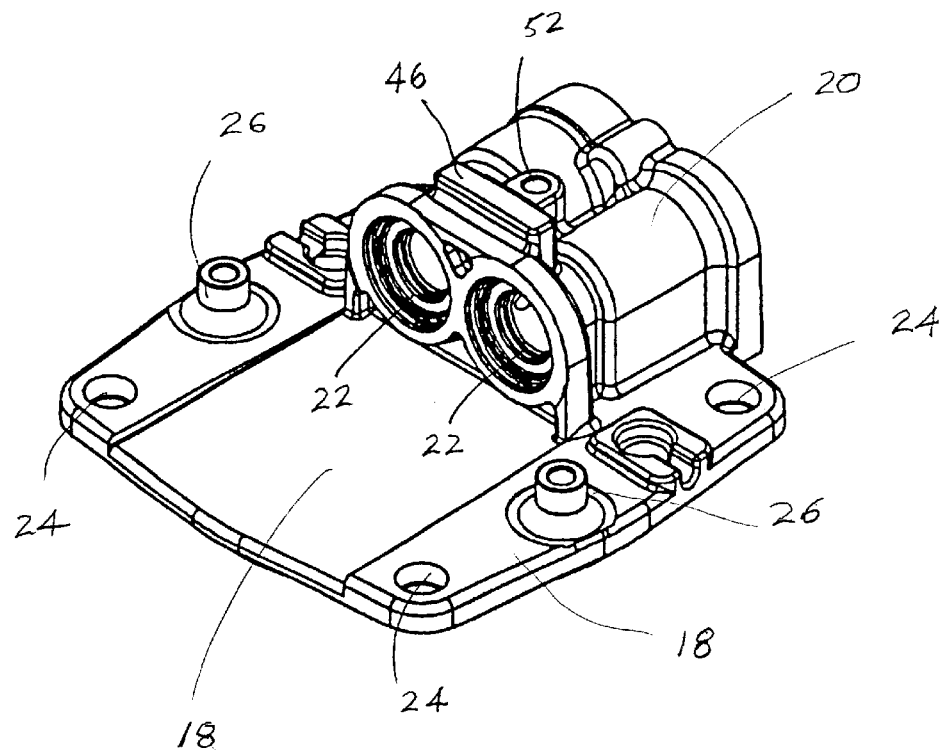
FIG. 3 is a perspective view of the modulator housing of FIG. 1.
Figure 4:
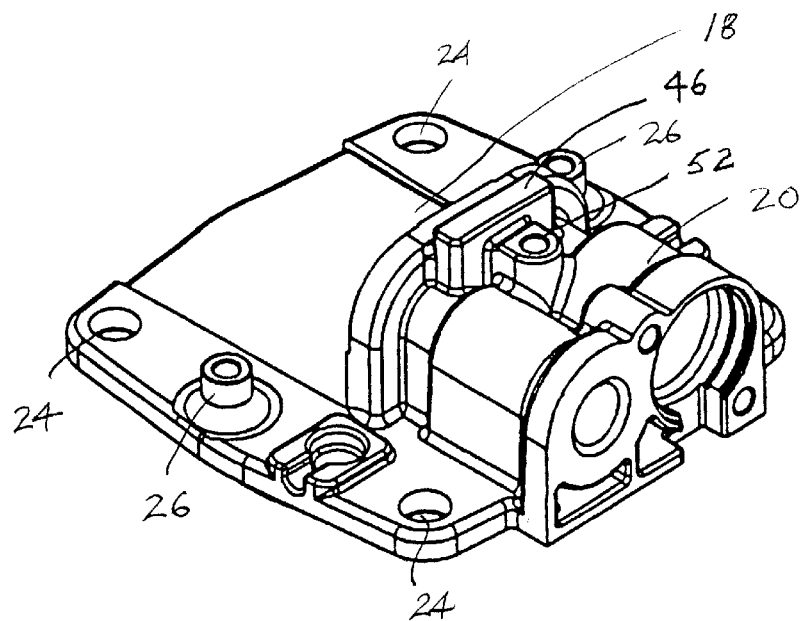
FIG. 4 is another perspective view of the modulator housing of FIG. 1.

With additional reference to FIGS. 3 and 4, the modulator housing 12 includes a substantially flat or planar portion 18 for receiving the solenoid pack 14. The modulator housing also includes a housing 20 that is formed at one end defining a set of valve chambers 22 for interacting with the solenoid pack 14. A plurality of openings 24 are disposed along spaced peripheral portions of the modulator housing for securing the modulator housing to a relay valve (not shown) via fasteners (not shown).

A pair of raised bosses 26 are preferably disposed at central locations near the edges of the modulator housing 12 for engagement with the clamp 16. Of course other mounting locations can be used without departing from the scope and intent of the present invention. The raised bosses 26 which are integrally joined to the housing are machined, for example, along an outer periphery to form a first component securing the clamp to the modulator housing. The machining operation maintains a desired tolerance and allows for a precise fit between the raised bosses 26 and the clamp 16 as will be described further below.

With reference back to FIGS. 1 and 2, the solenoid pack 14 includes an electrical connection 28 at one end and solenoid valve interfaces (not shown) at another end for interacting with the valve chambers 22 of the housing 20. The solenoid pack 14 overlies the substantially planar portion 18 of the modulator housing and abuts against the housing 20.

Reference is made to FIGS. 5 and 6 which illustrate details of the clamp 16. The clamp 16 includes a first section or leg 30, a second section or leg 32, and third section or leg 34. The first leg 30 has an opening or window 36 adjacent a distal end that serves as one component of retaining means as will be described in greater detail below. The first leg also has an opening 38 between the distal end thereof and the opening 36 that is dimensioned to receive a fastener device for additional positive retention of the clamp in place as required by regulation.

The first leg 30 extends generally perpendicular relative to the second leg 32 and is generally parallel to the third leg 34. More specifically, and with additional reference to FIG. 7, the first leg 30 is slightly angled relative to the third leg, e.g., at five degrees in the preferred embodiment. The second leg, likewise, forms an angle with the third section 34, for example on the order of eighty-five degrees. It will be appreciated, however, that the invention should not be limited to the particular angles as shown and described.

A curved section 40 interconnects the first leg to the second leg. In the preferred arrangement, the first and second legs 30, 32 include an enlarged opening 42 (FIGS. 5 and 6) formed therethrough for receiving the electrical connector 28 of the solenoid pack. Thus, one end of the first leg and the entire second leg are defined by first and second portions. It will be appreciated by one skilled in the art that the particular configuration of the first and second legs must accommodate the solenoid pack and provide the desired flexibility/rigidity of the clamp, although other configurations that serve these purposes are also contemplated.

The third leg 34 includes openings 44 in each leg portion for engagement with the raised bosses 26 of the modulator housing. More specifically, the third leg is defined by a pair of flange members that each have a respective opening 44. The flange members are located at either side of the clamp 16.

A support flange 48 extends in an opposite direction relative to the third leg 34. The support flange 48 is generally parallel to the third leg and adds rigidity and additional strength to the clamp.

The clamp 16 is preferably a stamped construction that is capable of being elastically deformed for locking engagement with the modulator housing. More specifically, the first leg 30, second leg 32, and interconnecting curved portion 40 are placed in tension and urge the clamp to securely and lockingly engage the solenoid pack to the modulator housing with a sufficient compressive force. Simultaneously, the clamp does not damage the plastic material that forms a portion of the solenoid pack.

To assemble, the solenoid pack 14 is positioned on the modulator housing 12. More specifically, the solenoid pack is positioned on the modulator housing such that the solenoid valve interfaces with the valve chambers 22 in the modulator housing.

Next, the clamp 16 is positioned over the solenoid pack 14 and on the modulator housing 12. Particularly, the clamp is aligned such that the electrical connector 28 of the solenoid pack extends through the opening 42 of the clamp. Further, the openings 44 of the clamp are aligned to receive the raised bosses of the modulator housing therethrough.

When properly aligned, a load or force F is then applied to the curved section 40 of the clamp. The first and second legs elastically deform as a result of the load and the first leg 30 of the clamp is driven downwardly and forwardly from the position shown in FIG. 7 as represented by the unnumbered dashed line. The opening 36 of the clamp engages and snaps over a raised tab 46 on the modulator housing thus securely engaging the solenoid pack to the modulator housing. (See FIG. 8). The deformed clamp is prevented from being lifted over the raised tab 46 because of the spring force exerted by the deformed legs 30, 32 against the raised tab.

A fastener 50 is added through the opening 38 of the clamp and secured in an opening 52 (FIGS. 3 and 4) on the modulator housing. The fastener is not necessary to securely maintain the solenoid pack on the modulator housing. Nonetheless, the fastener is included as a redundant locking feature to further maintain the clamp in position against the solenoid pack.

Figure 8:
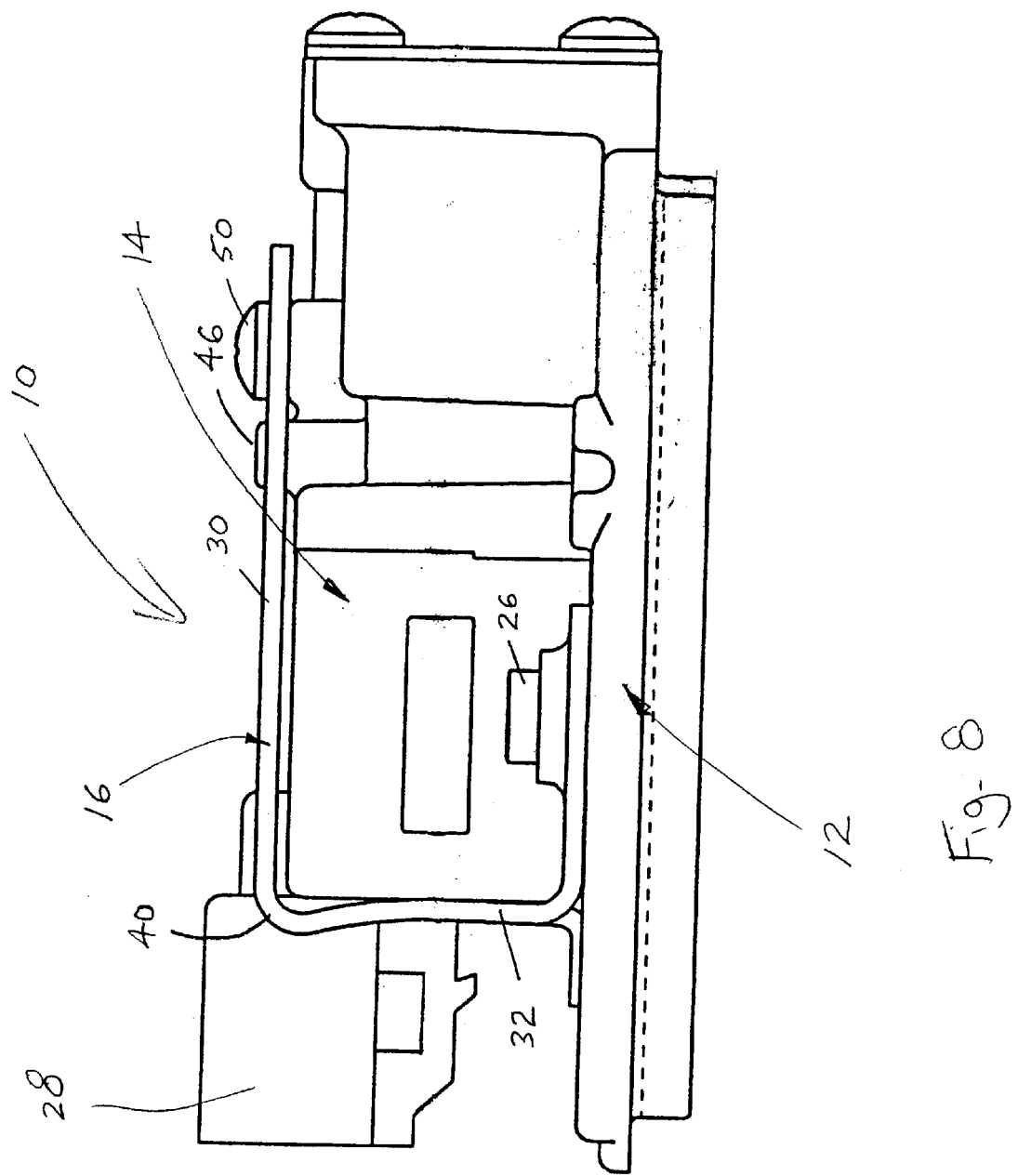
FIG. 8 is an elevational view of the clamp assembly of FIG. 1 in a clamped position.

With reference to FIG. 8 the completed assembly of the clamp is shown. Notably, the clamp 16 is fully engaged with the modulator housing and the solenoid pack is securely held in position thereon. More specifically, the openings 44 receive the raised bosses 26 of the modulator housing. Also, the opening 36 of the clamp is securely engaged to the raised tab 46 of the modulator housing. The first leg 30 is held in parallel relation to the third leg 34 and the second leg 32 is perpendicular to both of the first and third legs 30, 34.

The invention has been described with reference to the preferred embodiments. Obviously, modifications and alterations will occur to others upon reading and understanding the preceding detailed description. It is intended that the invention be construed as including all such modifications and alterations in so far as they come within the scope of the appended claims or the equivalents thereof.

Having thus described the present invention, it is now claimed:

1. A clamp assembly comprising:
    a modular housing having a raised boss and a raised tab;
    a valve assembly; and
    a clamp having a first leg defining an opening engaging the raised tab of the modulator housing, a second leg disposed generally perpendicular to the first leg, and a third leg including a hole engaging the raised boss of the modulator housing, the third leg dimensioned to be in parallel, tensioned relation relative to the first leg.

2. The clamp assembly of claim 1 wherein the clamp includes a spring portion for maintaining a holding force against the valve assembly and maintaining the position of the valve assembly on the modulator housing.

3. The clamp assembly of claim 1 further comprising a fastener for holding the clamp to the valve assembly.

4. The clamp of claim 1 wherein the stiffness of the leaf spring section allows the clamp to accommodate varying tolerances and limits the load transferred to the valve assembly.

5. A method of holding a valve assembly to a modulator housing by means of a clamp, including a first leg having an opening, a second leg extending therefrom and interconnecting the first leg with a third leg having openings therethrough, the second leg disposed perpendicular to the first and third legs, comprising the steps of:
- positioning a valve assembly on the modulator housing;
- positioning the clamp on the modulator housing such that the openings of the third leg are aligned with raised bosses of the modulator housing;
- applying a force to the clamp to secure the valve assembly to the modulator housing thereby causing the opening of to first leg to fasten onto a raised tab of the modulator housing and the openings of to third leg to fasten onto the raised bosses, the clamp deforming and maintaining a force against the valve assembly onto the modulator housing.

6. The method of claim 5 further comprising the step of: inserting a fastener through the clamp for securing the valve assembly to the modulator housing.

7. The method of claim 5 further comprising the step of: elastically deforming the first and second legs;
urging the first leg from an angled, non-parallel relation with third leg to a clamped, substantially parallel relation.

8. The method of claim 5 further comprising the step of: urging the first leg from an angled, non-parallel relation with the second leg to a clamped, substantially parallel rotation.

9. The method of claim 5 further comprising the step of: elastically deforming the first and second legs to clamp the valve assembly to the modulator housing.

10. A clamp for clamping a valve assembly to a modulator housing of an anti-lock brake system, said clamp comprising:
- first and second legs and a resilient central portion interconnecting said first and second legs in a generally U-shaped configuration;
- said first leg of said clamp having a first opening adapted to receive a first portion of said modulator housing and said second leg of said clamp having a second opening adapted to receive a second portion of said modulator housing;
- said central portion of said clamp having an engagement surface adapted to engage said valve assembly to secure said valve assembly to said modulator housing;
- said central portion of said clamp being resiliently deformable to move said first leg relative to said second leg and relative to the modulator housing from a non-clamping position to a clamping position in which said first opening receives said first portion of said modulator housing, thereby to block relative movement between said first leg and said modulator housing.

11. A clamp as set forth in claim 10 wherein the second portion of the modulator housing includes at least one raised boss, and wherein said second opening in said second leg comprises at least one opening adapted to receive the at least one raised boss in a precise fit thereby to block movement of said second leg relative to the modulator housing.

12. A clamp as set forth in claim 11 wherein the first portion of the modulator housing includes at least one raised tab, and wherein said first opening in said first leg comprises at least one opening adapted to receive the at least one raised tab in a manner to block movement of said first leg relative to the modulator housing.

13. A clamp as set forth in claim 12 wherein said first and second legs of said clamp are tensioned by said central portion of said clamp when said central portion of said clamp secures said valve assembly to said modulator housing.

14. A clamp as set forth in claim 10 wherein said first and second legs of said clamp are tensioned by said central portion of said clamp when said central portion of said clamp secures said valve assembly to said modulator housing.

15. A clamp as set forth in claim 14 wherein said central portion of said clamp is resiliently deformed by being flattened upon assembly of said clamp and said valve assembly to said modulator housing, said central portion of said clamp applying a restoring force to said first and second legs that tensions said first and second legs.

16. A clamp as set forth in claim 10 further comprising a fastener for helping to secure said first leg of said clamp to said modulator housing.

17. A clamp for securing a valve assembly to a modulator housing of an anti-lock brake system, said clamp comprising:
- first and second legs and a resilient central portion interconnecting said first and second legs, wherein said first and second leas and said resilient central portion form a generally U-shaped configuration;
- said central portion of said clamp being engageable with the valve assembly to secure the valve assembly to the modulator housing;
- said first leg of said clamp engaging a first portion of the modulator housing and said second leg of said clamp engaging a second portion of the modulator housing when said central portion of said clamp secures the valve assembly to the modulator housing, said first and second legs of said clamp being tensioned by said central portion of said clamp when said central portion of said clamp secures the valve assembly to the modulator housing.

18. A clamp as set forth in claim 17 wherein said central portion of said clamp is resiliently deformed upon assembly of said clamp and the valve assembly to the modulator housing, said central portion of said clamp applying a restoring force to said first and second legs that tensions said first and second legs.

19. A clamp as set forth in claim 18 wherein said first leg of said clamp moves relative to said second leg from a non-clamping position to a clamping position in which said first opening receives the first portion of the modulator housing, thereby to block relative movement between said first leg and the modulator housing.

20. A clamp as set forth in claim 17 wherein the second portion of the modulator housing includes at least one raised boss, and wherein said second leg of said clamp comprises at least one opening adapted to receive the at least one raised boss in a precise fit thereby to block movement of said second leg relative to the modulator housing.

21. A clamp as set forth in claim 17 wherein the first portion of the modulator housing includes at least one raised tab, and wherein said first leg of said clamp comprises at least one opening adapted to receive the at least one raised tab in a manner to block movement of said first leg relative to the modulator housing.

22. A method of assembling a valve assembly to a modulator housing with a resilient clamp, said method comprising the steps of:
- placing the valve assembly in position on the modulator housing;
- placing the clamp on the modulator housing so that a raised boss on the modulator housing extends trough a first opening in the clamp;
- elastically deforming the clamp by applying assembly force to the clamp so that a second opening in the clamp moves relative to the modulator housing to a position overlying a raised tab of the modulator housing;

applying further assembly force to the clamp so that the second opening in the clamp moves relative to the modulator housing to a position in which the raised tab of the modulator housing engages in the second opening; and releasing the assembly force to allow the clamp resiliently to assume a position clamping the valve assembly to the modulator housing.

23. A method as set forth in claim 22 wherein said step of placing the clamp on the modulator housing comprises placing a first leg of the clamp in engagement with the raised boss of the modulator housing; the clamp also having a second leg and having a third leg that extends between and interconnects the first and second legs in a generally U-shaped configuration.

24. A method as set forth in claim 23 wherein said step of releasing the assembly force comprises allowing the third leg of the clamp to exert a restoring force on the first and second legs of the clamp.

25. A method as set forth in claim 24 wherein the restoring force tensions the first and second legs of the clamp to maintain the clamp in position o the modulator housing.

26. A method as set forth in claim 22 wherein said steps of elastically deforming the clamp and applying further assembly force to the clamp include tensioning portions of the clamp that are in engagement with portions of the modulator housing, the tensioned clamp portions remaining in tension after performing said releasing step.

27. A method of assembling a valve assembly to a modulator housing with a resilient clamp, said method comprising the steps of:

placing the valve assembly in position on the modulator housing;

placing a first leg of the clamp in engagement with a first portion of the modulator housing and a second leg of the clamp in a position adjacent to a second portion of the modulator housing;

elastically deforming a third leg of the clamp by applying assembly force to the clamp so that the second leg of the clamp moves relative to the modulator housing to a position in which the second leg of the clamp is in engagement with the second portion of the modulator housing; and releasing the assembly force to allow the clamp resiliently to assume a position in which the third leg of the clamp clamps the valve assembly to the modulator housing;

said elastically deforming step including the step of tensioning the first leg of the clamp and the second leg of the clamp, the first and second clamp legs remaining in tension after performing said releasing step.

* * * * *